United States Patent
Jia et al.

(10) Patent No.: US 11,573,443 B2
(45) Date of Patent: Feb. 7, 2023

(54) LIQUID CRYSTAL DISPLAY PANEL AND METHOD FOR MANUFACTURING SAME, AND LIQUID CRYSTAL DISPLAY

(71) Applicant: BOE TECHNOLOGY GROUP CO., LTD., Beijing (CN)

(72) Inventors: Qian Jia, Beijing (CN); Xinxing Wang, Beijing (CN); Yingtao Wang, Beijing (CN); Xuefei Sun, Beijing (CN); Xiaona Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 17/254,888

(22) PCT Filed: Mar. 10, 2020

(86) PCT No.: PCT/CN2020/078601
§ 371 (c)(1),
(2) Date: Dec. 22, 2020

(87) PCT Pub. No.: WO2020/192411
PCT Pub. Date: Oct. 1, 2020

(65) Prior Publication Data
US 2021/0208449 A1 Jul. 8, 2021

(30) Foreign Application Priority Data
Mar. 27, 2019 (CN) .......................... 201910238185.2

(51) Int. Cl.
*G02F 1/1333* (2006.01)
*G02F 1/1335* (2006.01)

(52) U.S. Cl.
CPC .... *G02F 1/133331* (2021.01); *G02F 1/13338* (2013.01); *G02F 1/133325* (2021.01); *G02F 1/133504* (2013.01); *G02F 2202/28* (2013.01)

(58) Field of Classification Search
CPC ................................................ G02F 1/133331
See application file for complete search history.

(56) References Cited

U.S. PATENT DOCUMENTS

| | | |
|---|---|---|
| 2011/0163975 A1 | 7/2011 | Li et al. |
| 2012/0212890 A1 | 8/2012 | Hoshino et al. |
| | | (Continued) |

FOREIGN PATENT DOCUMENTS

| | | |
|---|---|---|
| CA | 2259759 A1 | 7/1999 |
| CN | 101751183 A | 6/2010 |
| | (Continued) | |

OTHER PUBLICATIONS

Second office action of Chinese application No. 201910238185.2 dated Jun. 30, 2021.

(Continued)

*Primary Examiner* — Edmond C Lau
(74) *Attorney, Agent, or Firm* — Fay Sharpe LLP (57) ABSTRACT

A liquid crystal display panel, including a liquid crystal cell, a liquid crystal, a light-transmitting cover plate and a light-transmitting support structure; where the liquid crystal is located in the liquid crystal cell, the cover plate covers a side where a target surface for emitting light is located of the liquid crystal cell, and the support structure is located between the cover plate and the liquid crystal cell; and an orthogonal projection region of the support structure on the target surface is a partial region of the target surface, and the partial region comprises at least part of an active display region of the target surface.

13 Claims, 6 Drawing Sheets

(56) References Cited

U.S. PATENT DOCUMENTS

| | | | |
|---|---|---|---|
| 2016/0147113 A1* | 5/2016 | Chang | G02F 1/13338 349/12 |
| 2016/0238873 A1 | 8/2016 | Song | |
| 2017/0003536 A1 | 1/2017 | Chen et al. | |
| 2017/0038616 A1 | 2/2017 | Sethumadhavan et al. | |
| 2017/0276986 A1 | 9/2017 | Chen et al. | |
| 2020/0103690 A1 | 4/2020 | Wu et al. | |

FOREIGN PATENT DOCUMENTS

| | | |
|---|---|---|
| CN | 201965378 U | 9/2011 |
| CN | 104614898 A | 5/2015 |
| CN | 204390211 U | 6/2015 |
| CN | 104915064 A | 9/2015 |
| CN | 105138191 A | 12/2015 |
| CN | 105892166 A | 8/2016 |
| CN | 106129082 A | 11/2016 |
| CN | 107195664 A | 9/2017 |
| CN | 107357075 A | 11/2017 |
| CN | 207867178 U | 9/2018 |
| CN | 108958535 A | 12/2018 |
| CN | 109061934 A | 12/2018 |
| CN | 109814298 A | 5/2019 |
| JP | 2006163742 A | 6/2006 |

OTHER PUBLICATIONS

International search report of PCT application No. PCT/CN2020/078601 dated May 27, 2020.
First office action of Chinese application No. 201910238185.2 dated Feb. 22, 2021.

* cited by examiner

LIQUID CRYSTAL DISPLAY PANEL AND METHOD FOR MANUFACTURING SAME, AND LIQUID CRYSTAL DISPLAY

CROSS-REFERENCE TO RELATED APPLICATIONS

The present disclosure is a 371 of PCT Application No. PCT/CN2020/078601, filed on Mar. 10, 2020, which claims priority to Chinese Patent Application No. 201910238185.2, filed with the State Intellectual Property Office on Mar. 27, 2019 and titled "LIQUID CRYSTAL DISPLAY PANEL AND METHOD FOR MANUFACTURING SAME, AND LIQUID CRYSTAL DISPLAY DEVICE", which is incorporated herein by reference in its entirety.

TECHNICAL FIELD

The present disclosure relates to a liquid crystal display panel and a method for manufacturing the same, and a liquid crystal display device.

BACKGROUND

With the development of display technologies, liquid crystal display panels have been widely used in electronic devices.

For example, the liquid crystal display panel includes: an array substrate, a color filter substrate, and a liquid crystal. The array substrate and the color filter substrate are opposite to each other to form a liquid crystal cell, and the liquid crystal is located in the liquid crystal cell.

SUMMARY

In one aspect, there is provided a liquid crystal display panel including: a liquid crystal cell, a liquid crystal, a light-transmitting cover plate and a light-transmitting support structure; wherein the liquid crystal is located in the liquid crystal cell, the cover plate covers a side where a target surface for emitting light is located of the liquid crystal cell, and the support structure is located between the cover plate and the liquid crystal cell; and an orthogonal projection region of the support structure on the target surface is a partial region of the target surface, and the partial region includes at least part of an active display region of the target surface.

In another aspect, there is provided a method for manufacturing a liquid crystal display panel, and the method includes:

manufacturing a liquid crystal cell and a liquid crystal located in the liquid crystal cell; and forming a cover plate covering the liquid crystal cell on a side where a target surface of the liquid crystal cell is located and a support structure located between the cover plate and the liquid crystal cell;

wherein the side where the target surface of the liquid crystal cell is located is configured to emit light, the cover plate and the support structure are both light-transmitting, an orthogonal projection region of the support structure on the target surface is a partial region of the target surface, and the partial region includes at least part of an active display region of the target surface.

In yet another aspect, there is provided a liquid crystal display device including the above liquid crystal display panel.

DESCRIPTION OF EMBODIMENTS

In order to make the objectives, technical solutions and advantages of the present disclosure clearer, the followings will describe the embodiments of the present disclosure in detail with reference to the drawings.

A liquid crystal display panel in the related art has a phenomenon of water ripples when being pressed. An embodiment of the present disclosure provides a new liquid crystal display panel, and a phenomenon of water ripples does not occur or is weakened when the liquid crystal display panel is pressed.

Figure 1:
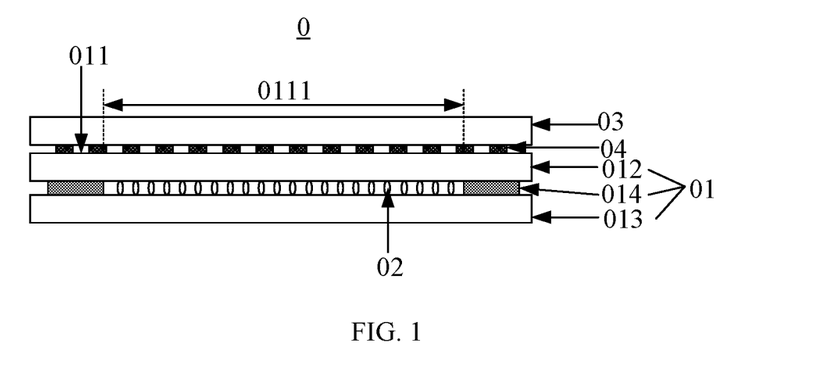
FIG. 1 is a schematic structural diagram of a liquid crystal display panel according to an embodiment of the present disclosure.

FIG. 1 is a schematic structural diagram of a liquid crystal display panel according to an embodiment of the present disclosure. As shown in FIG. 1, the liquid crystal display panel 0 may include: a liquid crystal cell 01, a liquid crystal 02, a light-transmitting cover plate 03 and a light-transmitting support structure 04.

The liquid crystal 02 is located in the liquid crystal cell 01, the cover plate 03 covers a side of the liquid crystal cell 01 where a target surface 011 for emitting light is located, and the support structure 04 is located between the cover plate 03 and the liquid crystal cell 01.

An orthogonal projection region of the support structure 04 on the target surface 011 is a partial region of the target surface 011, and the partial region includes at least part of an active display region (AA) 0111 of the target surface 011.

It should be noted that the liquid crystal cell 01 usually includes an array substrate 013 and a color filter substrate 012 which are disposed oppositely. FIG. 1 takes the condition that the target surface 011 is a surface of the color filter substrate 012 away from the liquid crystal 02 as an example. Optionally, the target surface may also be a surface of the array substrate 013 away from the liquid crystal 02, which is not limited in the embodiment of the present disclosure.

In summary, in the liquid crystal display panel according to the embodiment of the present disclosure, the cover plate and the support structure are disposed on the side where the target surface for emitting light is located of the liquid crystal cell, and the orthogonal projection region of the support structure on the target surface of the liquid crystal cell is a partial region of the target surface. Therefore, when the liquid crystal display panel is pressed, the support structure only transmits part of the stress to the liquid crystal cell, thereby reducing the stress in the liquid crystal cell and weakening the phenomenon of water ripples of the liquid crystal display panel caused by the stress transmitted to the liquid crystal cell.

In addition, the active display region 0111 of the target surface 011 is located at a position where the liquid crystal display panel is relatively easy to be pressed. The orthogonal projection region of the support structure 04 on the target surface 011 includes at least part of the active display region 0111 of the target surface 011, which can greatly reduce the stress in the liquid crystal cell when the liquid crystal display panel is pressed. Therefore, the phenomenon of water ripples of the liquid crystal display panel is further weakened.

Optionally, the liquid crystal cell 01 may further include a frame sealant 014 located between the array substrate 013 and the color filter substrate 012, which is not limited in the embodiment of the present disclosure.

Optionally, a light transmittance of the support structure 04 and a light transmittance of the cover plate 03 are both greater than or equal to 90% (for example, 99% or 100%). The light transmittance of the support structure 04 and the light transmittance of the cover plate 03 may also be less than 90% (for example 85%, etc.), which is not limited in the embodiment of the present disclosure. The light transmittances of the support structure 04 and the cover plate 03 are set to be larger, so that the influence of the support structure 04 and the cover plate 03 on the brightness of the liquid crystal display panel 0 can be reduced.

Further, in the embodiment of the present disclosure, a refractive index of the support structure 04 may be set to be close to a reference refractive index, and the reference refractive index is the refractive index of a part of the liquid crystal cell 01 close to the support structure 04. For example, an absolute value of a difference between the refractive index of the support structure 04 and the reference refractive index is set to be less than a refractive index threshold. For example, the refractive index threshold may be a value of 0.1, 0.2 and the like. The reference refractive index may be 1.5. At this time, the refractive index of the support structure 04 may range from 1.4 to 1.6 (for example, 1.42). When the refractive index of the support structure 04 is closer to the reference refractive index, the support structure 04 refracts light from the liquid crystal cell 01 in a lighter degree, and an offset of the light emitted into the support structure 04 is relatively small, thereby reducing the influence of the support structure 04 on an image displayed by the liquid crystal display panel 0.

It should be noted that the part in the liquid crystal cell 01 close to the support structure 04 may be a base substrate of the array substrate 013 or a base substrate of the color filter substrate 012 (FIG. 1 takes the condition that the structure is the base substrate of the color filter substrate 012 as example). Optionally, materials of the base substrate of the array substrate 013 and the base substrate of the color filter substrate 012 may be both glass, and a material of the cover plate 03 may also be glass.

Optionally, a ratio of an area of the orthogonal projection region of the support structure 04 on the target surface 011 to an area of the target surface 011 belongs to [0.5, 1). It can be seen that the support structure 04 in the embodiment of the present disclosure covers a larger area of the target surface 011, and most light emergent from the liquid crystal cell 01 can pass through the support structure 04 and be emergent from the liquid crystal display panel. In this case, if the refractive index of the support structure 04 is closer to the above reference refractive index, the offset of the most light emergent from the liquid crystal cell 01 is smaller, thereby ensuring a better display effect of the liquid crystal display panel.

Optionally, a material of the support structure may include a light-transmitting material such as a photoresist or an OCR (Optically Clear Resin).

Figure 2:
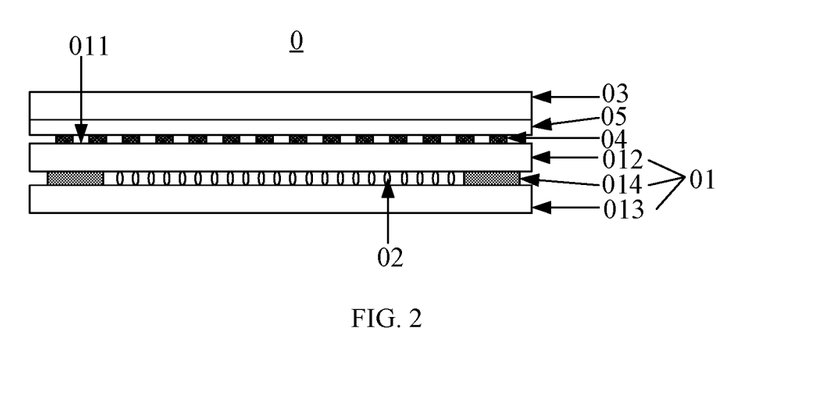
FIG. 2 is a schematic structural diagram of another liquid crystal display panel according to an embodiment of the present disclosure.

Optionally, with reference to FIG. 2 the liquid crystal display panel 0, based on FIG. 1, may further include: a light-transmitting adhesive layer 05 located between the cover plate 03 and the support structure 04. For example, a material of the adhesive layer 05 may include an OCA (Optically Clear Adhesive). The adhesive layer 05 is configured to bond the support structure 04 and the cover plate 03.

Further, the liquid crystal display panel 0 shown in FIG. 1 and FIG. 2 may also include a touch electrode layer (not shown in FIG. 1 and FIG. 2) located between the liquid crystal cell 01 and the cover plate 03. It can be seen that the liquid crystal display panel according to the present disclosure has a touch function, and the touch electrode layer of the liquid crystal display panel may be located outside the liquid crystal cell. For example, the touch electrode layer may be located between the liquid crystal cell 01 and the support structure 04. In the liquid crystal display panel shown in FIG. 2, the touch electrode layer may also be located between the adhesive layer 05 and the cover plate 03. In addition, the above touch electrode layer may be a self-capacitive touch electrode layer or a mutual-capacitive touch electrode layer. The touch electrode layer may also be located in the liquid crystal cell, which is not limited in the embodiment of the present disclosure.

The liquid crystal display panel according to the embodiment of the present disclosure further includes an upper polarizer and a lower polarizer which are located on both sides of the liquid crystal 02. Optionally, the upper polarizer may be located on a side where the target surface is located of the liquid crystal cell, and the lower polarizer may be located on a side opposite to the side where the target surface is located of the liquid crystal cell. The upper polarizer, the touch electrode layer, the support structure, and the cover plate (the liquid crystal display panel shown in FIG. 2 also includes the adhesive layer) may be superposed on the side where the target surface is located of the liquid crystal cell, and the superposing order is not limited by the embodiment of the present disclosure.

The support structure in the embodiment of the present disclosure may have multiple implementable manners, and three of the implementable manners will be described below as examples.

Figure 3:
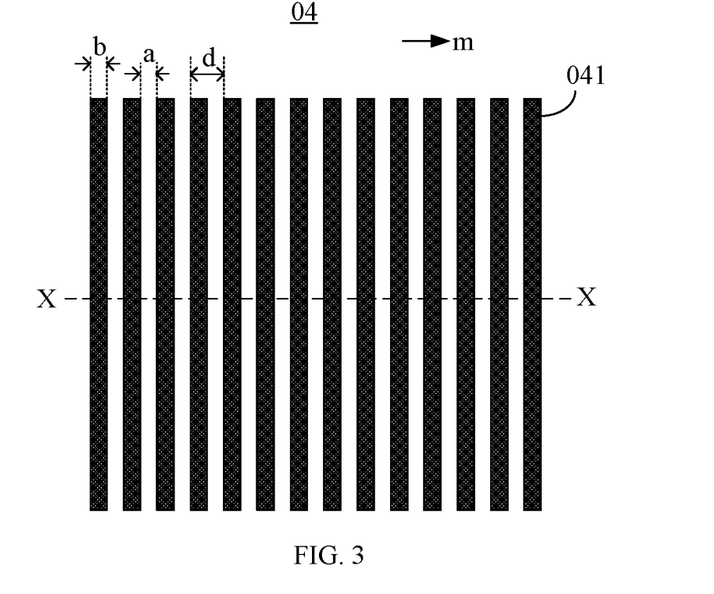
FIG. 3 is a top view of a support structure according to an embodiment of the present disclosure.

(1) In a first implementable manner of the support structure 04, the support structure 04 may include a one-dimensional grating structure. For example, FIG. 3 is a top view of a support structure 04 according to an embodiment of the present disclosure, and the schematic diagram of the support structure shown in FIG. 1 and FIG. 2 is the schematic diagram of a cross-section taken at XX in FIG. 3. As shown in FIG. 3, the one-dimensional grating structure may include a plurality of support bars 041 disposed side by side between the liquid crystal cell and the cover plate, the plurality of support bars 041 are parallel to each other, and an interval exists between any two adjacent support bars 041.

Optionally, in a slit width direction m of the one-dimensional grating structure (parallel to an arrangement direction of the above plurality of support bars 041), a ratio of a period d of the one-dimensional grating structure to a length of a pixel in the liquid crystal cell is less than 1/5. The period d of the one-dimensional grating structure may belong to [1 micrometer, 10 micrometers]. A slit width of the one-dimensional grating structure (that is, the interval between adjacent support bars 041) is a, a width of the support bar 041 is b, and the period d of the one-dimensional grating structure is equal to a+b. The above pixel may include at least two sub-pixels of different colors. For example, the pixel includes a red sub-pixel, a blue sub-pixel, and a green sub-pixel. It should be noted that when the ratio of the period d of the one-dimensional grating structure to the length of the pixel in the liquid crystal cell is less than 1/5, the one-dimensional grating structure covers a larger area of the target surface. At this time, if the refractive index of the support structure 04 is closes to the above reference refractive index, the offset of the most light emergent from the liquid crystal cell 01 is smaller, thereby ensuring a better display effect of the liquid crystal display panel.

Optionally, when the ratio of the area of the orthogonal projection region of the support structure 04 on the target surface 011 to the area of the target surface 011 belongs to [0.5, 1), a duty cycle of the one-dimensional grating structure belongs to [0.5, 1).

Figure 4:
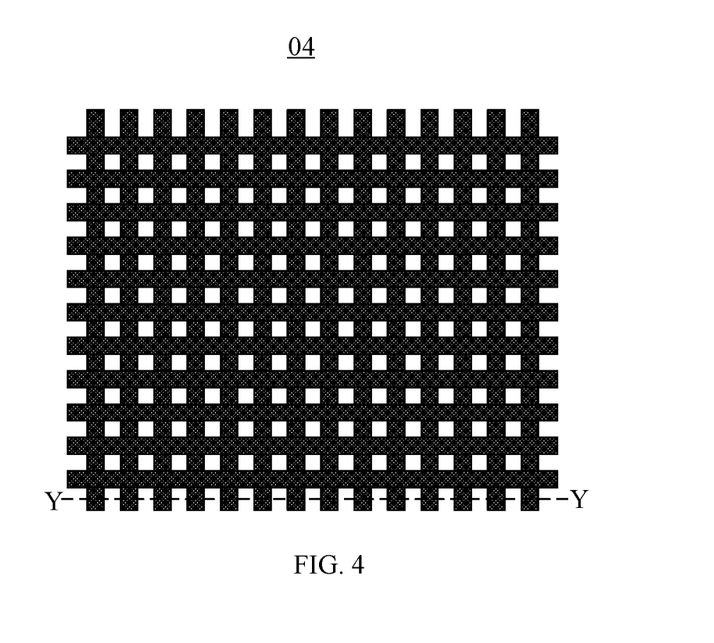
FIG. 4 is a top view of another support structure according to an embodiment of the present disclosure.

(2) In a second implementable manner of the support structure 04, the support structure 04 may include a two-dimensional grating structure. For example, FIG. 4 is a top view of another support structure 04 according to an embodiment of the present disclosure, and the schematic diagram of the support structure shown in FIG. 1 and FIG. 2 is the schematic diagram of the cross-section taken at YY in FIG. 4. As shown in FIG. 4, the two-dimensional grating structure may be grid-shaped. By comparing FIG. 3 and FIG. 4, it can be seen that an orthogonal projection region of the two-dimensional grating structure on the target surface is larger than the orthogonal projection region of the one-dimensional grating structure on the target surface. The two-dimensional grating structure is more capable of enabling the offset of the most light emergent from the liquid crystal cell 01 to be smaller, thereby ensuring a better display effect of the liquid crystal display panel.

Figure 5:
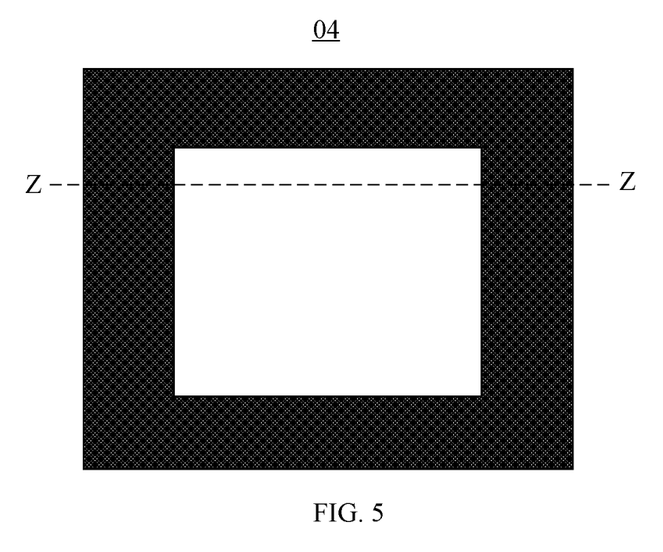
FIG. 5 is a top view of yet another support structure according to an embodiment of the present disclosure.
Figure 6:
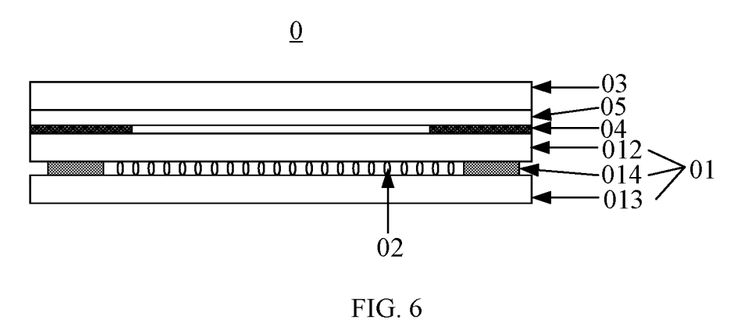
FIG. 6 is a schematic structural diagram of yet another liquid crystal display panel according to an embodiment of the present disclosure.

(3) In a third implementable manner of the support structure 04, the support structure 04 may be in a ring shape, such as a circular ring shape or a square ring shape as shown in FIG. 5. When the support structure 04 is as shown in FIG. 5, the liquid crystal display panel 0 may be as shown in FIG. 6 (the liquid crystal display panel shown in FIG. 6 may not include the adhesive layer 05), and the schematic diagram of the support structure shown in FIG. 6 is the schematic diagram of a cross-section taken at ZZ in FIG. 5. Optionally, in other implementable manners of the support structure 04, the support structure may also have other shapes, such as a honeycomb shape, a circle and an ellipse, which is not limited in the embodiment of the present disclosure.

Figure 7:
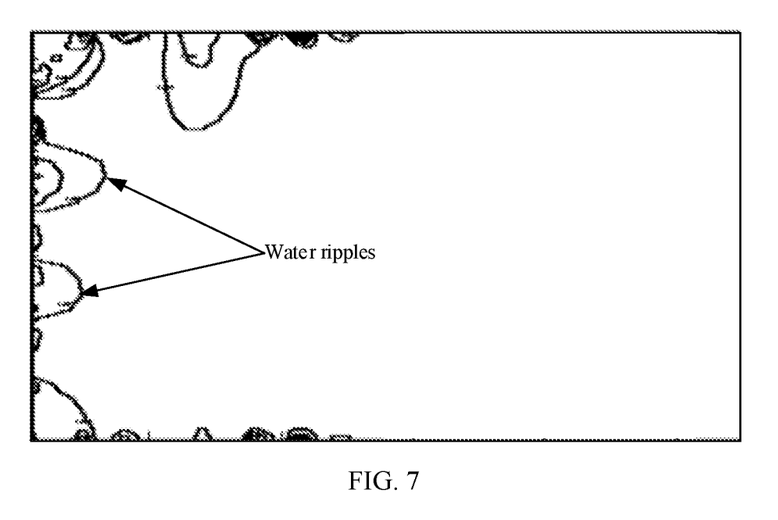
FIG. 7 is a schematic diagram of water ripples in a liquid crystal display panel according to an embodiment of the present disclosure.
Figure 8:
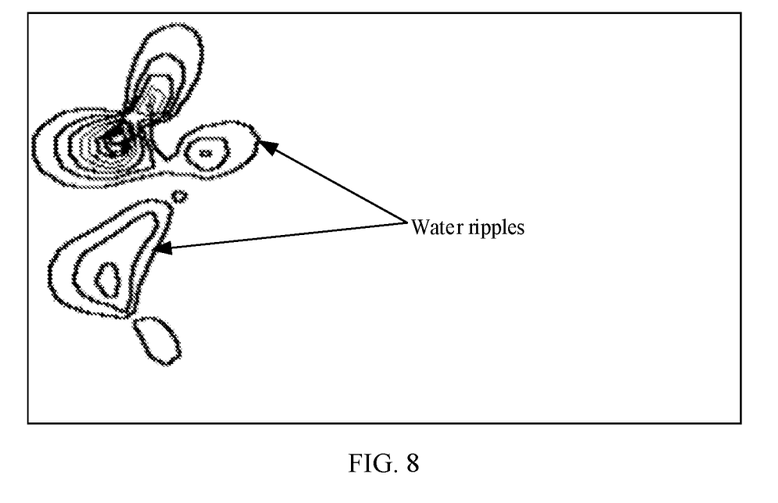
FIG. 8 is a schematic diagram of water ripples in a liquid crystal display panel provided by related art.

In the embodiment of the present disclosure, due to the support structure, when the liquid crystal display panel is pressed, the stress in the liquid crystal cell is reduced, and the phenomenon of water ripples of the liquid crystal display panel caused by the stress transmitted to the liquid crystal cell is avoided, or the phenomenon of water ripples is weakened. For example, FIG. 7 is a schematic diagram of water ripples after the liquid crystal display panel according to the embodiment of the present disclosure is pressed, and FIG. 8 is a schematic diagram of water ripples after the liquid crystal display panel provided by the related art is pressed. By comparing FIG. 7 with FIG. 8, it can be seen that after the liquid crystal display panel is pressed, the liquid crystal display panel according to the embodiment of the present disclosure has less water ripples than the liquid crystal display panel provided by the related art.

When the water ripples appear on the liquid crystal display panel, brightness at positions of the water ripples is higher, which affects the display effect of the liquid crystal display panel. Brightness of the positions of the water ripples in the liquid crystal display panel provided by the related art is about 17.5 nits, while brightness of the positions of the water ripples in the liquid crystal display panel according to the embodiment of the present disclosure is about 0.02 nits. It can be seen that when the water ripples appear on the liquid crystal display panel according to the embodiment of the present disclosure, the brightness of the positions of the water ripples is smaller, and the display effect of the liquid crystal display panel is better.

In summary, in the liquid crystal display panel according to the embodiment of the present disclosure, the cover plate and the support structure are disposed on the side where the target surface for emitting light is located of the liquid crystal cell, and the orthogonal projection region of the support structure on the target surface of the liquid crystal cell is a partial region of the target surface. Therefore, when the liquid crystal display panel is pressed, the support structure only transmits part of the stress to the liquid crystal cell, thereby reducing the stress in the liquid crystal cell and relieving the phenomenon of water ripples of the liquid crystal display panel caused by the stress transmitted to the liquid crystal cell.

Figure 9:
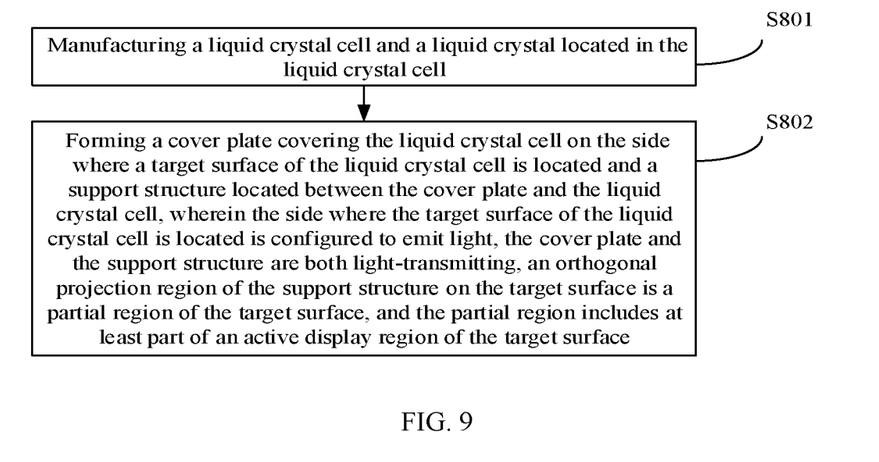
FIG. 9 is a flowchart of a method for manufacturing a liquid crystal display panel according to an embodiment of the present disclosure.

FIG. 9 is a flowchart of a method for manufacturing a liquid crystal display panel according to an embodiment of the present disclosure. The method may be configured to manufacture the liquid crystal display panel shown in FIG. 1 or FIG. 2. As shown in FIG. 9, the method may include:

In S801, a liquid crystal cell and a liquid crystal located in the liquid crystal cell are manufactured.

In S802, a cover plate covering the liquid crystal cell is formed on a side where a target surface is located of the liquid crystal cell, and a support structure located between the cover plate and the liquid crystal cell is formed, the side where the target surface of the liquid crystal cell is located is used for light emission, and the cover plate and the support structure are both light-transmitting. An orthogonal projection region of the support structure on the target surface is a partial region of the target surface, and the partial region includes at least part of an active display region of the target surface.

In summary, in the liquid crystal display panel manufactured by the method according to the embodiment of the present disclosure, the cover plate and the support structure are disposed on the side where the target surface for emitting light is located of the liquid crystal cell, and the orthogonal projection region of the support structure on the target surface of the liquid crystal cell is a partial region of the target surface. Therefore, when the liquid crystal display panel is pressed, the support structure only transmits part of the stress to the liquid crystal cell, thereby reducing the stress in the liquid crystal cell and relieving the phenomenon of water ripples of the liquid crystal display panel caused by the stress transmitted to the liquid crystal cell.

Figure 10:
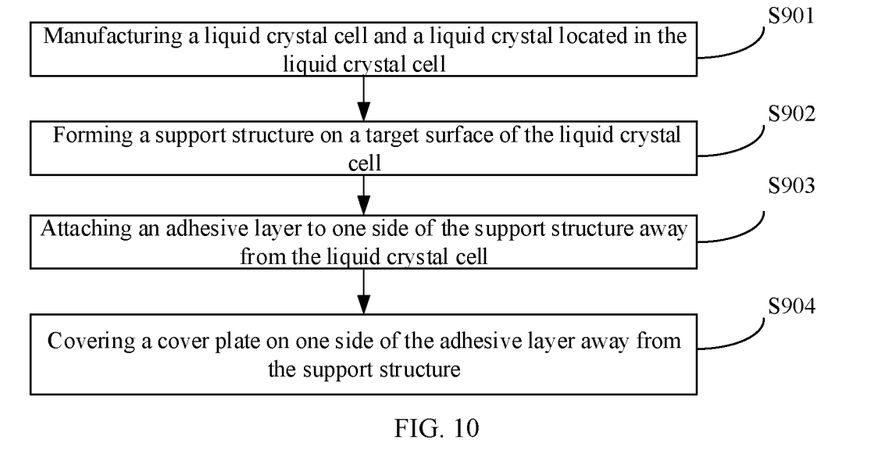
FIG. 10 is a flowchart of a method for manufacturing another liquid crystal display panel according to an embodiment of the present disclosure.

FIG. 10 is a flowchart of a method for manufacturing another liquid crystal display panel according to an embodiment of the present disclosure. The method may be configured to manufacture the liquid crystal display panel shown in FIG. 2. As shown in FIG. 10, the method may include:

In S901, a liquid crystal cell and a liquid crystal located in the liquid crystal cell are manufactured.

Figure 11:
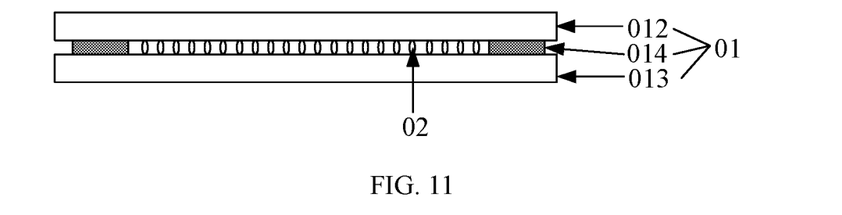
FIG. 11 is a schematic diagram of a manufacturing process of a liquid crystal display panel according to an embodiment of the present disclosure.

For example, in S901, an array substrate and a color filter substrate may be manufactured separately, and then the array substrate and the color filter substrate are disposed oppositely. The liquid crystal is injected between the array substrate and the color filter substrate, and a frame sealant is disposed between the array substrate and the color filter substrate to obtain the liquid crystal cell 01 and the liquid crystal 02 located in the liquid crystal cell 01, as shown in FIG. 11.

In S902, a support structure is formed on the target surface of the liquid crystal cell.

It should be noted that an orthogonal projection region of the support structure on the target surface is a partial region of the target surface rather than an entire area of the target surface, and such a partial region includes at least part of the active display region of the target surface.

Optionally, a material of the support structure includes a photoresist. In S902, the support structure may be formed by a patterning process.

Figure 12:
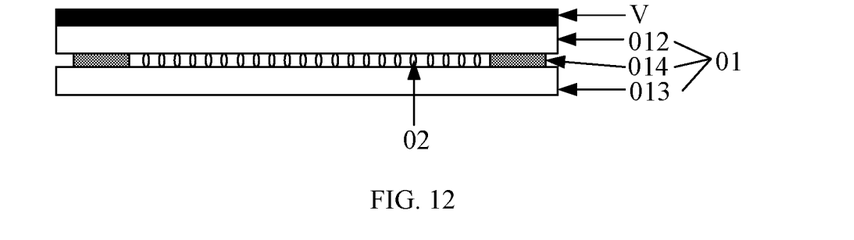
FIG. 12 is a schematic diagram of a manufacturing process of another liquid crystal display panel according to an embodiment of the present disclosure.

For example, in S902, a method such as coating, physical vapor deposition (PVD) or chemical vapor deposition (CVD) may be first adopted for the target surface of the liquid crystal cell to form a layer of photoresist material on the target surface, so that a photoresist layer V covering the liquid crystal cell 01 as shown in FIG. 12 is obtained. The PVD includes a physical deposition method such as magnetron sputtering or thermal evaporation, and the CVD includes a chemical deposition method such as plasma enhanced chemical vapor deposition (PECVD).

Figure 13:
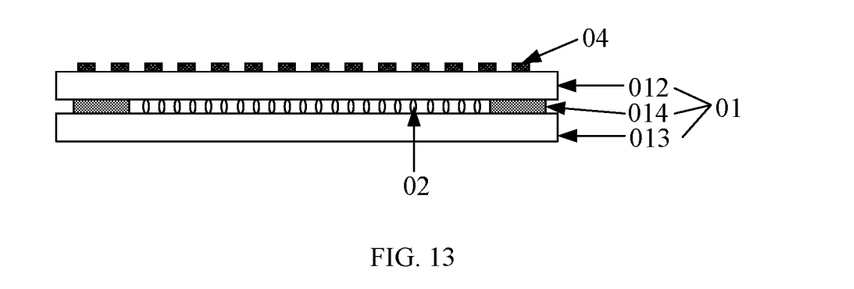
FIG. 13 is a schematic diagram of a manufacturing process of another liquid crystal display panel according to an embodiment of the present disclosure.

Afterwards, a mask may be used to expose the photoresist layer V, so that the photoresist layer V forms an exposed region and a non-exposed region. The photoresist layer V is processed by a development process to remove the photoresist in one of the exposed region and the non-exposed region, and to remain the photoresist in the other region remains, thereby obtaining the support structure 04 shown in FIG. 13.

Optionally, when the material of the support structure includes the photoresist, the support structure may also be formed without the patterning process. For example, after the photoresist layer is formed, the photoresist layer is processed by an embossing manner to obtain the support structure.

S903, an adhesive layer is attached to one side of the support structure away from the liquid crystal cell.

Figure 14:
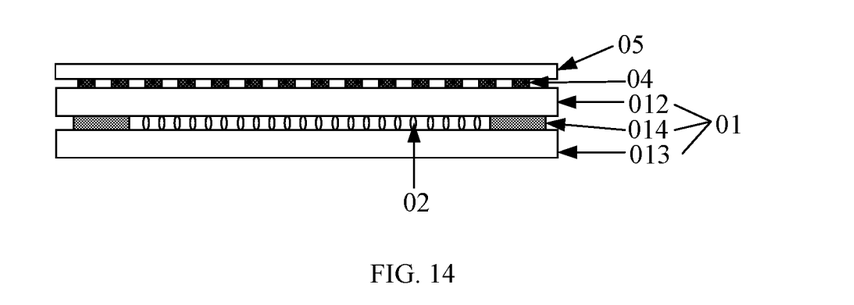
FIG. 14 is a schematic diagram of a manufacturing process of another liquid crystal display panel according to an embodiment of the present disclosure.

The adhesive layer may cover the entire liquid crystal cell. In S903, the adhesive layer 05 shown in FIG. 14 may be attached to the side of the support structure away from the liquid crystal cell.

In S904, a cover plate is enabled to cover one side of the adhesive layer away from the support structure.

The cover plate is light-transmitting, and a material of the cover plate may be a light-transmitting material such as glass.

After the liquid crystal cell, the liquid crystal, the support structure and the adhesive layer are obtained, the cover plate may cover one side of the adhesive layer away from the support structure, then the liquid crystal display panel as shown in FIG. 2 can be obtained.

It should be noted that the liquid crystal display panel according to the embodiment of the present disclosure may further include a touch electrode layer located between the liquid crystal cell and the cover plate. For example, the touch electrode layer may be located between the liquid crystal cell and the support structure, or in the liquid crystal display panel shown in FIG. 2, the touch electrode layer may also be located between the adhesive layer 05 and the cover plate 03. When the liquid crystal display panel is manufactured, a manufacturing process of the touch electrode layer may be reasonably added to the manufacturing method according to a position of the touch electrode layer. For example, in the liquid crystal display panel shown in FIG. 2, if the touch electrode layer is located between the adhesive layer 05 and the cover plate 03, then before S904, the touch electrode layer may be formed on the cover plate. In S904, the cover plate on which the touch electrode layer is formed may cover one side of the adhesive layer away from the support structure, and the touch electrode layer is enabled to be located between the cover plate and the adhesive layer.

Optionally, the liquid crystal display panel according to the embodiment of the present disclosure further includes an upper polarizer and a lower polarizer which are located on both sides of the liquid crystal. For example, the upper polarizer may be located on the side where the target surface is located of the liquid crystal cell, and the lower polarizer may be located on a side opposite to the side where the target surface is located of the liquid crystal cell. The upper polarizer, the touch electrode layer, the support structure, and the cover plate may be superposed on the side of the target surface of the liquid crystal cell, and the embodiment of the present disclosure does not limit the superposing order. When the liquid crystal display panel is manufactured, according to the positions of the upper polarizer and the lower polarizer, an arrangement process of the upper polarizer and the lower polarizer may be reasonably added to the manufacturing method, which is not limited in the embodiment of the present disclosure.

It should be noted that the embodiment shown in FIG. 10 takes the manufacturing of the liquid crystal display panel shown in FIG. 2 as an example. When the liquid crystal display panel shown in FIG. 1 needs to be manufactured, S903 does not need to be performed, and in S904, the cover plate may directly cover one side of the support structure away from the liquid crystal cell.

In addition, the embodiment shown in FIG. 10 takes the condition that the material of the support structure includes the photoresist as an example. Optionally, the material of the support structure may include the OCR, and a screen-printing manner may be adopted when the support structure is formed, which will not be repeated by the embodiment of the present disclosure here.

In summary, in the liquid crystal display panel manufactured by the method according to the embodiment of the present disclosure, the cover plate and the support structure are disposed on the side where the target surface for emitting light is located of the liquid crystal cell, and the orthogonal projection region of the support structure on the target surface of the liquid crystal cell is a partial region of the target surface. Therefore, when the liquid crystal display panel is pressed, the support structure only transmits part of the stress to the liquid crystal cell, thereby reducing the stress in the liquid crystal cell and relieving the phenomenon of water ripples of the liquid crystal display panel caused by the stress transmitted to the liquid crystal cell.

An embodiment of the present disclosure provides a liquid crystal display device, and the liquid crystal display device may include the liquid crystal display panel according to the embodiment of the present disclosure (for example, the liquid crystal display panel shown in FIG. 1 or FIG. 2).

The display device may be any product or component having a display function, such as electronic paper, a mobile phone, a tablet computer, a television, a monitor, a laptop, a digital photo frame and a navigator.

It should be noted that the method embodiments of the present disclosure and the corresponding embodiments of the liquid crystal display panel of the present disclosure may be cross referenced, which is not limited in the embodiments of the present disclosure. The sequence of respective operations in the method embodiments of the present disclosure may be adjusted appropriately, and the operations may be deleted or added correspondingly according to the situation. Within the technical scope disclosed in the present disclosure, any variations of the method easily derived by a person of ordinary skill in the art shall fall within the protection scope of the present disclosure, which is not repeated here.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A liquid crystal display panel, comprising a liquid crystal cell, a liquid crystal, a light-transmitting cover plate and a light-transmitting support structure; wherein
the liquid crystal is located in the liquid crystal cell, the cover plate covers a side where a target surface for emitting light is located of the liquid crystal cell, and the support structure is located between the cover plate and the liquid crystal cell; and
an orthogonal projection region of the support structure on the target surface is a partial region of the target surface, and the partial region comprises at least part of an active display region of the target surface.

2. The liquid crystal display panel according to claim 1, wherein an absolute value of a difference between a refractive index of the support structure and a reference refractive index is less than a refractive index threshold, and the reference refractive index is a refractive index of a part in the liquid crystal cell close to the support structure.

3. The liquid crystal display panel according to claim 2, wherein the refractive index threshold is 0.1.

4. The liquid crystal display panel according to claim 1, wherein a light transmittance of the support structure and a light transmittance of the cover plate are both greater than or equal to 90%.

5. The liquid crystal display panel according to claim 1, wherein a ratio of an area of the orthogonal projection region to an area of the target surface belongs to [0.5, 1).

6. The liquid crystal display panel according to claim 1, wherein the support structure comprises: a one-dimensional grating structure, a two-dimensional grating structure or a honeycomb structure.

7. The liquid crystal display panel according to claim 1, wherein the support structure comprises a one-dimensional grating structure; and
in a slit width direction of the one-dimensional grating structure, a ratio of a period of the one-dimensional grating structure to a length of a pixel in the liquid crystal cell is less than $\frac{1}{5}$, wherein the pixel comprises sub-pixels of at least two colors.

8. The liquid crystal display panel according to claim 1, wherein a material of the support structure comprises a photoresist.

9. The liquid crystal display panel according to claim 1, wherein a material of the support structure comprises an optically clear resin.

10. The liquid crystal display panel according to claim 1, further comprising a light-transmitting adhesive layer located between the cover plate and the support structure.

11. The liquid crystal display panel according to claim 10, wherein a material of the adhesive layer comprises an optically clear adhesive.

12. The liquid crystal display panel according to claim 1, wherein the liquid crystal display panel further comprises a touch electrode layer located between the liquid crystal cell and the cover plate.

13. A liquid crystal display device, the liquid crystal display device comprises the liquid crystal display panel according to claim 1.

* * * * *